United States Patent
Balakrishnan et al.

(10) Patent No.: US 12,010,667 B2
(45) Date of Patent: Jun. 11, 2024

(54) CARRIER AGGREGATION CAPABILITY ADVERTISEMENT

(71) Applicant: Apple Inc., Cupertino, CA (US)

(72) Inventors: Swaminathan Balakrishnan, Los Gatos, CA (US); Haijing Hu, Los Gatos, CA (US); Sreevalsan Vallath, Dublin, CA (US); Prateek Sharma, San Jose, CA (US); Cesar Perez, Sunnyvale, CA (US); Adesh Kumar, San Jose, CA (US); Deepankar Bhattacharjee, Milpitas, CA (US); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 17/250,886

(22) PCT Filed: Sep. 20, 2018

(86) PCT No.: PCT/CN2018/106724
§ 371 (c)(1),
(2) Date: Mar. 19, 2021

(87) PCT Pub. No.: WO2020/056674
PCT Pub. Date: Mar. 26, 2020

(65) Prior Publication Data
US 2021/0377941 A1   Dec. 2, 2021

(51) Int. Cl.
*H04W 72/0453* (2023.01)
*H04L 5/00* (2006.01)
*H04W 72/51* (2023.01)

(52) U.S. Cl.
CPC ....... *H04W 72/0453* (2013.01); *H04L 5/0092* (2013.01); *H04W 72/51* (2023.01)

(58) Field of Classification Search
CPC ..... H04B 7/0413; H04L 5/001; H04L 5/0023; H04L 5/0091; H04L 5/0092; H04W 72/0453
See application file for complete search history.

(56) References Cited

U.S. PATENT DOCUMENTS

| | | | |
|---|---|---|---|
| 2012/0178465 A1 | 7/2012 | Lin et al. | |
| 2016/0127055 A1* | 5/2016 | Dayal | H04L 5/0085 370/252 |
| 2018/0070293 A1 | 3/2018 | Venkataraman et al. | |

FOREIGN PATENT DOCUMENTS

| | | |
|---|---|---|
| EP | 2744262 | 6/2014 |
| WO | 2018-085721 | 5/2018 |

\* cited by examiner

*Primary Examiner* — Zhensheng Zhang
(74) *Attorney, Agent, or Firm* — Fay Kaplun & Marcin, LLP

(57) ABSTRACT

A user equipment (UE) is configured with a carrier aggregation (CA) functionality and UE connected to a network via a base station that serves as a primary serving cell (PCell) providing a primary component carrier (PCC) to the UE. The UE determines a plurality of bands that are supported by the UE for use in the CA functionality, generates an individual band information element (IE) including band information for the bands, determines at least one representative CA combination having an order, the order indicating a total number of component carriers (CCs), the at least one representative CA combination forming a basis to extrapolate a plurality of CA combinations having the order based on the band information, generates a representative CA combination IE including the at least one representative CA combination and transmits the individual band IE and the representative CA combination IE to the base station.

20 Claims, 5 Drawing Sheets

CARRIER AGGREGATION CAPABILITY ADVERTISEMENT

BACKGROUND INFORMATION

A user equipment (UE) may be configured with a variety of different capabilities. For example, the UE may be capable of establishing a connection with a network. Specifically, the UE may connect to a Long Term Evolution (LTE) network. While connected to the LTE network, the UE may utilize further network capabilities. For example, the UE may utilize a carrier aggregation (CA) functionality in which a primary component carrier (CC) (PCC) and at least one secondary CC (SCC) are used to communicate data over the various LTE bands. The network component to which the UE has connected may be an evolved Node B (eNB) that provides the PCC. The connected eNB may also control how the carrier aggregation is to be utilized with the SCCs. For example, the eNB may request measurements for LTE bands which are associated with the SCCs and receive the measurements to determine how the available bands are to be used in the carrier aggregation functionality. Thus, the UE may utilize a plurality of LTE bands or carriers that are available to communicate data.

In using the CA functionality, the eNB requests capability information from the UE. The capability information may include whether the UE is configured to use the CA functionality and an identification of individual bands along with other characteristics of the bands (e.g., layers) that are supported by the UE. The capability information may further include CA combinations of two or more bands with the specified characteristics that are supported by the UE. In a conventional advertisement functionality of the supported CA combinations, the UE is tasked with advertising each permutation of the supported CA combinations. For example, with only two supported CCs (e.g., A and B) each with only one supported layer (e.g., 1), the UE may advertise two CA combinations that are supported (e.g., A1-B1 and B1-A1, where the first listed CC is the PCC). In another example, with two supported CCs (e.g., A and B) each with two supported layers (e.g., 1 and 2), the UE may advertise eight CA combinations that are supported (e.g., A1-B1, A1-B2, A2-B1, A2-B2, B1-A1, B1-A2, B2-A1, and B2-A2). With even higher order CA combinations (e.g., three, four, five, etc.) and additionally supported layers, the permutations of supported CA combinations increase significantly. For example, a five CC CA combination may also entail four CC CA combinations, three CC CA combinations, and two CC CA combinations.

Those skilled in the art will appreciate that the number of bands and layers that may be supported may result in a substantially large number of permutations for the supported CA combinations. However, the advertisement functionality that indicates the supported CA combinations to the eNB limits the number of CA combinations that may be advertised. For example, prior to Release 13 of the 3GPP standard, the advertisement functionality supported advertisement of 128 CA combinations. Accordingly, there may be a significant number of CA combinations that may not be advertised. In Release 13 of the 3GPP standard, additional fields have decreased the CA combination lists. However, these measures only alleviate the problem for advertising supported CA combinations to a limited extent.

SUMMARY

In an exemplary embodiment, a method is performed by a user equipment (UE) configured with a carrier aggregation (CA) functionality, the UE connected to a network via a base station that serves as a primary serving cell (PCell) providing a primary component carrier (PCC) to the UE. The method includes determining a plurality of bands that are supported by the UE for use in the CA functionality, generating an individual band information element (IE) including band information for the bands, determining at least one representative CA combination having an order, the order indicating a total number of component carriers (CCs), the at least one representative CA combination forming a basis to extrapolate a plurality of CA combinations having the order based on the band information, generating a representative CA combination IE including the at least one representative CA combination and transmitting the individual band IE and the representative CA combination IE to the base station.

In another exemplary embodiment, a method is performed by an evolved Node B (eNB) configured with a carrier aggregation (CA) functionality, the eNB serving as a primary serving cell (PCell) providing a primary component carrier (PCC) to a user equipment (UE). The method includes receiving an individual band information element (IE) including band information for a plurality of bands that are supported by the UE for use in the CA functionality, receiving a representative CA combination IE including at least one representative CA combination, the representative CA combination corresponding to an order, the order indicating a total number of component carriers (CCs) and determining a plurality of CA combinations having the order based on the representative CA combination and the band information.

In a still further exemplary embodiment, a user equipment (UE) is described as having a transceiver and a processor. The, transceiver is configured with a carrier aggregation (CA) functionality to connect to a network via a base station that serves as a primary serving cell (PCell) providing a primary component carrier (PCC) and at least one second base station that serves as a secondary serving cell (SCell) providing a secondary component carrier (SCC). The processor is configured to determine a plurality of bands that are supported by the UE for use in the CA functionality, generate an individual band information element (IE) including band information for the bands, determine at least one representative CA combination having an order, the order indicating a total number of component carriers (CCs), the at least one representative CA combination forming a basis to extrapolate a plurality of CA combinations having the order based on the band information and generate a representative CA combination IE including the at least one representative CA combination.

DETAILED DESCRIPTION

Figure 1:
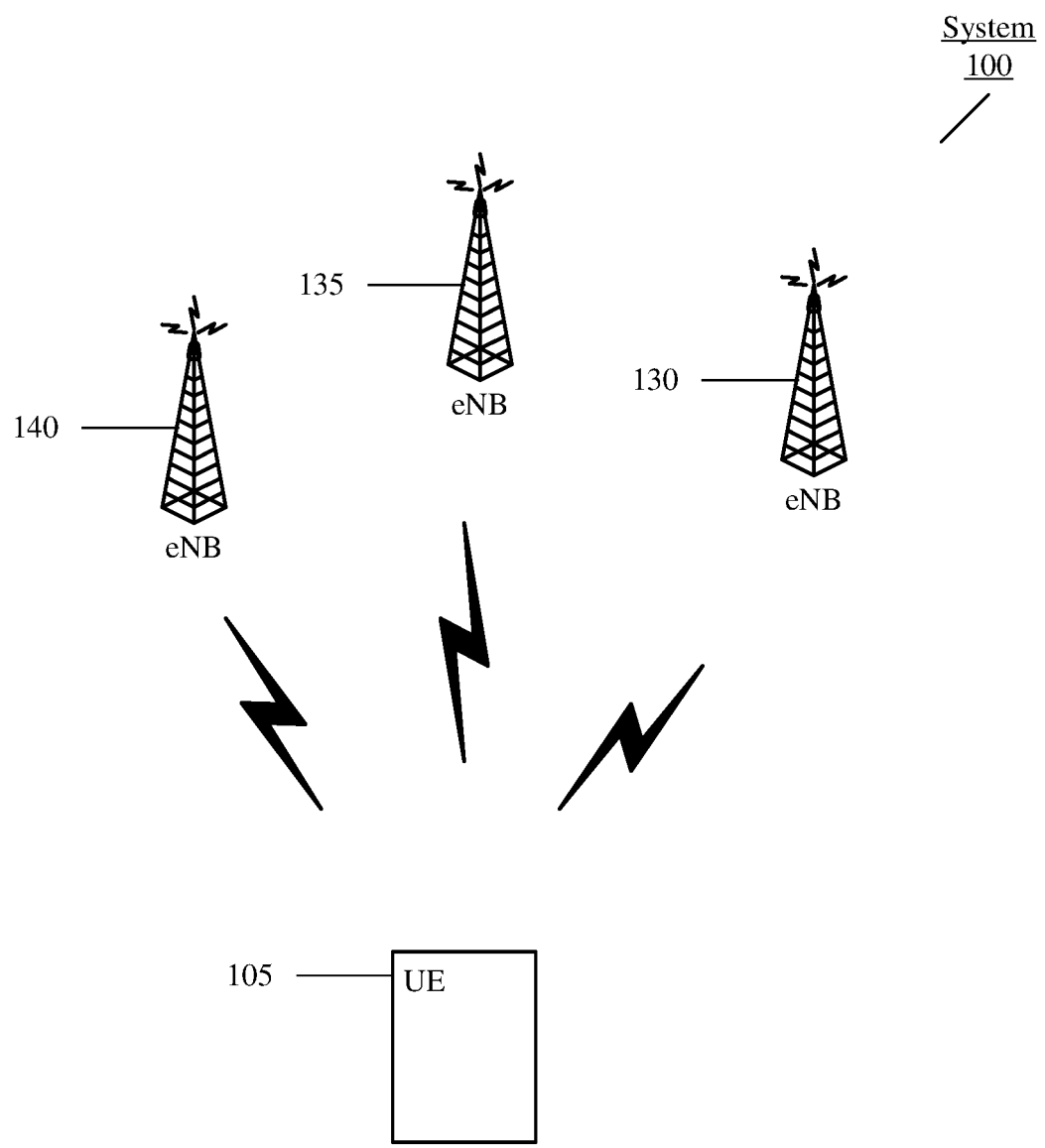
FIG. 1 shows an exemplary system utilizing a carrier aggregation functionality according to various exemplary embodiments described herein.

The exemplary embodiments may be further understood with reference to the following description and the related appended drawings, wherein like elements are provided with the same reference numerals. The exemplary embodiments are related to a device, system, and method for advertising various settings that are supported in a carrier aggregation (CA) functionality. The settings may relate to combinations of bands that are supported in the CA functionality and at least one characteristic of the respective band that is supported. The exemplary embodiments provide a mechanism where the UE advertises representative CA combinations, thereby allowing the network to determine additional permutations of CA combinations that the UE is capable of supporting.

Initially, the exemplary embodiments are described with regard to a user equipment (UE) that is connected to a Long Term Evolution (LTE) network in which the UE is CA capable and the LTE network is configured with the CA functionality. The CA functionality may include a primary serving cell (PCell) providing a primary component carrier (CC) (PCC) and at least one secondary serving cell (SCell) respectively providing a secondary CC (SCC) where the CCs correspond to bands that are used in the CA functionality. The PCell and SCells may be a network component of the LTE network such as an evolved Node B (eNB) or a small cell such as a Home eNB (HeNB). The CA functionality is also configured such that the PCell manages the use of the CA functionality based in part on information provided by the UE. It is noted that the term PCell may be used when the CA functionality is being used. However, in this description, the term may also refer to the eNB to which the UE has established a connection even when the CA functionality is not currently active.

In an exemplary implementation of the CA functionality, the PCell may provide a first CC (e.g., 10 MHz) representing the PCC while each SCell may provide a respective second CC (e.g., 10 MHz) representing the SCC. In one exemplary embodiment, the CCs may be intra-band carriers with continuous CCs. However, those skilled in the art will understand that other types of CA may also be used such as intra-band CA with non-continuous CCs, inter-band CA, or any combination of these three types. Furthermore, those skilled in the art will understand that other bandwidths may be used such as 1.4, 3, 5, 15, or 20 MHz and the CA functionality may have two, three, four, five, etc. CCs that are aggregated. When two CCs each having a bandwidth of 10 MHz are combined, a total bandwidth of 20 MHz may result. When five CCs each having a bandwidth of 10 MHz are combined, a total bandwidth of 50 MHz may result. Further developments in the CA functionality may enable higher total bandwidth (e.g., a total bandwidth of 150 MHz). In this manner, an overall throughput may be increased. The exemplary embodiments may be configured to be implemented with any type of CA configuration.

The CA functionality being performed on the LTE network is only exemplary. The exemplary embodiments may be modified and/or used with any network that supports carrier aggregation or a substantially similar functionality in which a plurality of CCs are used. For example, it is expected that the next generation of cellular networks (e.g., 5G networks) will support functionalities similar to CA and the exemplary embodiments may be used with such a network and the various CA configurations that may be used.

Those skilled in the art will understand that the CA functionality is controlled by the eNB serving as the PCell for the UE. For example, upon detection that the UE is CA capable and a determination that the CA functionality is to be used (e.g., a rate of transmission to the UE is under a maximum possible rate of transmission via the PCell only), the PCell may enable the CA functionality. The SCells may be selected and used for any data exchange. Thus, the UE may be configured to utilize select SCells in an area where the UE is located. However, because the CA functionality is controlled by the PCell, the PCell may request or receive information from the UE so that a proper CA combination may be selected and used for the UE. For example, the UE provides CA related information so the PCell may select a CA combination that is supported by the UE.

As described above, in reporting the CA combinations that are supported by the UE to the PCell, a conventional approach entails the UE reporting all possible CA combinations. However, the UE may also report information related to further CA capabilities. In a first example, the CA functionality may also utilize a licensed assisted access (LAA) feature in which channels in the unlicensed 5 GHz band are used as CCs. When using the LAA feature, the available CCs may increase such that further CA combinations are to be reported. In a second example, the CA functionality may incorporate a multiple input and multiple output (MIMO) feature in which select bands used as CCs may support a plurality of layers. For example, the CA functionality may incorporate a 4×4 MIMO layer support with limited total layers that the UE may be configured to support. In a particular implementation, the LTE band 3 may support 2 layers and 4 layers. If the UE is capable of using these plurality of layers when using the LTE band 3 as a CC, the number of CA combinations that incorporate the LTE band 3 may increase (e.g., double). Therefore, as the number of layers increase for a given band, the number of CA combinations may further increase (e.g., multiplicatively). In a third example, in addition to higher order CC CA combinations (e.g., more than two CCs), the CA functionality may incorporate higher order bands used in a CC. For example, a higher order band may include a plurality of sub-bands. These sub-bands may further increase the number of CA combinations as each sub-band CA combination for a given band is to be reported.

The manner in which the LTE network operates including various features such as the CA functionality may be defined by the 3GPP standard. Under the 3GPP standard defined prior to Release 13, the UE may report a maximum of 128 CA combinations. There are situations where another 256 combinations (or even more), in addition to the 128, may be reported if the Request for Band (RFB) feature is implemented. However, as noted above, there may include scenarios where the number of bands that are supported are greater than the maximum number that is allowed to be reported. With an increasing number of available bands and support for these bands (e.g., LAA), the number of CA combinations may increase to an extent where the maximum number may only account for a minority of the supported CA combinations of the UE.

To allow for a greater amount of the supported CA combinations to be reported, Release 13 of the 3GPP standard has introduced additional fields to minimize the CA combination list. For example, Release 13 allows for a maxCCDL/UL support feature, a request reduced format feature, a skip fallback combination feature, etc. Those skilled in the art will understand that these features of Release 13 allow for select CA combinations to be omitted in the reporting based on corresponding determinations. However, despite these features, Release 13 alleviates the problem of reporting the supported CA combinations only to a limited extent since there is still an expectation and requirement to report transmission modes (e.g., permutations involving PCCs and SCCs), a number of layers that are supported for a CA combination, etc.

To address the manner in which CA combinations are reported from the UE to the PCell, the exemplary embodiments provide a coordinated reporting mechanism involving the PCell and the UE. The coordinated reporting mechanism of the exemplary embodiments may involve the UE providing individual band information as well as identifying the CA combinations that are supported by the UE and determining representative CA combinations for the supported CA combinations. When the PCell receives the individual band information and the representative CA combinations, the PCell may determine further supported CA combinations of the UE. As will be described in detail below, the PCell may execute operations to extrapolate the supported CA combinations based on the representative CA combinations. Accordingly, the PCell may select the manner of using the CA functionality for the UE based on a more comprehensive understanding of the capabilities of the UE.

FIG. 1 shows an exemplary system 100 utilizing a CA functionality according to various exemplary embodiments described herein. In the system 100, a UE 105 may be capable of using the CA functionality and may further be capable of reporting representative CA combinations to the PCell. The system 100 includes the UE 105 and a plurality of eNBs 130, 135, 140 of a LTE network. The UE 105 may associate with one of the eNBs 130-140 such as the eNB 130 to join the LTE network. The UE 105 and the eNBs 130-140 may also include the CA functionality and the coordinated reporting mechanism according to the exemplary embodiments. As the UE 105 is associated with the eNB 130, the eNB 130 may manage the CA functionality for CCs to be used by the UE 105 in which the eNB 130 may be the PCell and the eNBs 135, 140 may serve as the SCells. Accordingly, it may be assumed that the eNBs 135, 140 are within an operational range of the UE 105 to provide SCCs. The eNBs 130-140 being an eNB is only exemplary. The eNBs 130-140 may also be other types of access nodes for the network (e.g., gNB, HeNB, etc.). The system 100 including three eNBs and utilizing a CA functionality including up to three CCs is only exemplary. The system 100 may include further eNBs so that the CA functionality may utilize even higher order CC CA combinations (e.g., four CCs, five CCs, etc.).

Figure 2:
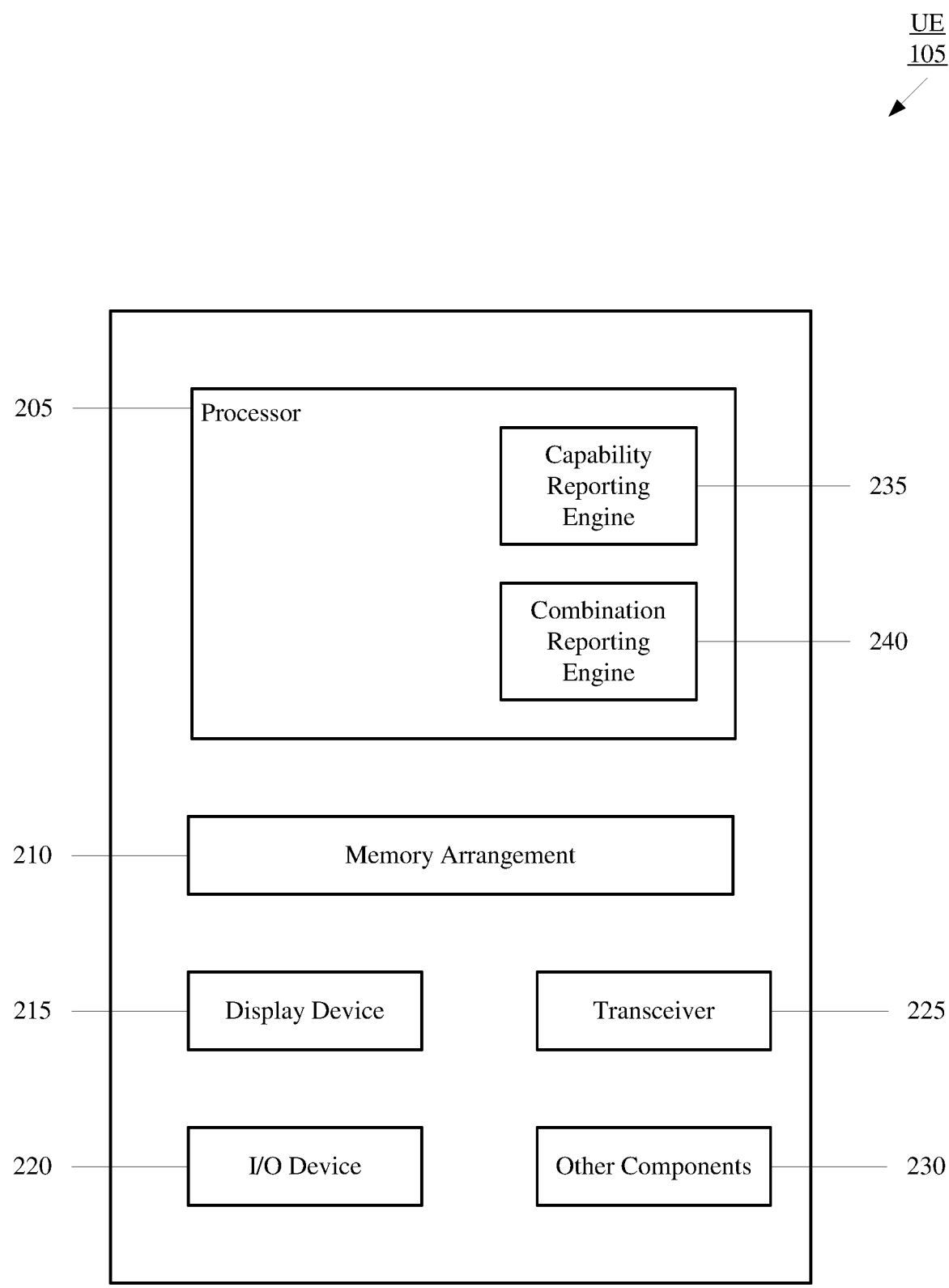
FIG. 2 shows an exemplary user equipment of the system of FIG. 1 according to various exemplary embodiments described herein.

FIG. 2 shows the exemplary UE 105 of the system 100 of FIG. 1 according to various exemplary embodiments described herein. As will be described below, the UE 105 may perform a first aspect of the coordinated reporting mechanism related to providing information to the eNB 130 serving as the PCell. In a first type of information, the UE 105 may transmit individual band information for bands that are supported by the UE 105. In a second type of information, the UE 105 may transmit representative CA combinations that may be used to extrapolate supported CA combinations of the UE 105 using the individual band information.

The UE 105 may be any electronic device configured to join a network via the eNB 130. For example, the UE 105 may be a mobile phone, tablet computer, smartphone, phablet, embedded device, wearable device, Cat-M device, Cat-M1 device, MTC device, eMTC device, other types of Internet of Things (IoT) device, etc. The UE 105 may operate on a variety of different frequencies or channels (i.e., range of continuous frequencies). Accordingly, the UE 105 may include components that enable different radio access technologies or capability of using a spectrum (e.g., bandwidth, channel, etc.) associated with these radio access technologies, particularly a LTE network. The UE 105 may include a processor 205, a memory arrangement 210, a display device 215, an input/output (I/O) device 220, a transceiver 225, and other components 230. The other components 230 may include, for example, sensors to detect movement and movement related data, an audio input device, an audio output device, a battery that provides a limited power supply, a data acquisition device, ports to electrically connect the UE 105 to other electronic devices, sensors to detect conditions of the UE 105, etc.

The processor 205 may be configured to execute a plurality of engines of the UE 105. For example, the engines may include a capability reporting engine 235 and a combination reporting engine 240. As will be described in further detail below, the capability reporting engine 235 may be configured to determine and generate the individual band information regarding supported bands of the UE 105. The combination reporting engine 240 may be configured to determine and generate the representative CA combinations indicative of the supported CA combinations of the UE 105. It is noted that the processor 205 may execute further engines of the UE 105. For example, a configuration engine may generate an indication that the UE 105 is CA capable. In another example, an indication engine may generate an indication that the UE 105 is configured with the coordinated reporting mechanism according to the exemplary embodiments. However, the indication that the UE 105 and/or the PCell is configured with the coordinated reporting mechanism may also entail the PCell indicating to the UE 105 that the PCell is configured with the coordinated reporting mechanism or a mutual indication where the PCell is directly notified by the UE 105 and the UE 105 is directly notified by the PCell.

The above described engines each being an application (e.g., a program) executed by the processor 205 is only exemplary. The functionality associated with the engines may also be represented as a separate incorporated component of the UE 105 or may be a modular component coupled to the UE 105, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some UEs, the functionality described for the processor 205 may be split among two or more processors such as a baseband processor and an applications processor. The exemplary embodiments may be implemented in any of these or other configurations of a UE.

The memory arrangement 210 may be one or more hardware components configured to store data related to operations performed by the UE 105. For example, the memory arrangement 210 may store data associated with supported bands, characteristics of the bands, and supported combinations of bands. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a network connection. For example, the transceiver 225 may be configured to establish a network connection to a LTE network that includes the eNBs 130-140. The transceiver 225 may also be configured to establish a network connection to other networks that may be used in a CA functionality (e.g., using LAA).

The capability reporting engine 235 may determine and generate the individual band information regarding supported bands of the UE 105. For example, the UE 105 may be configured to support a plurality of different LTE bands and non-LTE bands that may be used in the CA functionality. Each individual band may be reported to the PCell in an information element (IE). The individual band IE may list each supported band along with characteristics of the bands. For example, each band may also be listed with the downlink and uplink capability along with a number of layers that are supported. In a particular band, the LTE band 3 may support 2 or 4 layer MIMO and the individual band IE may indicate that the UE 105 is configured to use the 2 or 4 layers of the LTE band 3. Thus, the capability reporting engine 235 may identify the bands that are supported by the UE 105 and capable of being used in the CA functionality, identify the characteristics of these CA bands, and generate the individual band IE that indicates the identified information. Subsequently, the UE 105 may transmit the individual band IE to the PCell. The UE 105 may transmit the individual band IE at various times. For example, the UE 105 may transmit the individual band IE continuously, at predetermined time intervals, upon detection of a band that is supported, etc.

The capability reporting engine 235 may also be configured to report two CC CA combinations (e.g., Band A and Band B). As defined in the 3GPP standard (e.g., 3GPP 36.331), the UE 105 may list all the two CC CA combinations that are supported by the UE 105. Thus, for the supported bands, a pairing of the bands that are supported in the CA functionality may be determined. The two CC CA combinations may be reported individually so that an exhaustive list of the two CC CA combinations are included in an IE. The two CC IE may also list the two CC CA combinations for each supported higher order band. Subsequently, the UE 105 may transmit the two CC IE to the PCell. The UE 105 may transmit the two CC IE at various times. For example, the UE 105 may transmit the two CC IE upon association with the PCell.

The combination reporting engine 240 may determine and generate the representative CA combinations indicative of the supported CA combinations of the UE 105. The combination reporting engine 240 may perform its functionality for each supported CA combination based on a highest order CC CA combination. For example, if the UE 105 is configured to utilize a five CC CA combination, the combination reporting engine 240 may determine a representative CA combination for the five CC CA combinations. With the capability reporting engine 235 being responsible for reporting the two CC CA combinations in the two CC IE, the combination reporting engine 240 may be responsible for three or more CC CA combinations. As will be described in further detail below, the combination reporting engine 240 may determine representative CA combinations for a given set of bands that may be used as CCs in a given highest order CA combination. The representative CA combinations may be included in a corresponding IE that may be transmitted to the PCell. The UE 105 may transmit the representative CA combination IE at various times as described above for the other exemplary IEs.

The combination reporting engine 240 may also be configured to determine and generate a further IE that indicates a maximum number of aggregated layers for a supported CA combination. As noted above, each individual band may have associated characteristics related to how the band is supported to be used by the UE 105 in the CA functionality. For example, a highest order CC CA combination involving a particular set of bands may have a maximum MIMO support or a maximum number of layers that is supported. The combination reporting engine 240 may determine the layers for a given highest order CC CA combination and include the layers with an identified CA combination in an IE that may be transmitted to the PCell.

According to the exemplary embodiments, the information reported by the UE 105 in the coordinated reporting mechanism may allow the PCell to identify the supported CA combinations of the UE 105. In an exemplary implementation in which the individual band information and the representative CA combinations are determined, the UE 105 may report a four CC CA combination including LTE bands 2, 4, 5, and 30. The following describes a method performed by the UE 105 to provide the PCell with the above noted types of information so that the PCell may identify the supported CA combinations of the UE 105.

As noted above, the UE 105 may list the individual bands with the downlink and uplink capability and a corresponding number of layers that is supported by a respective band. The UE 105 may also list the two CC CA combinations of available bands that are supported as defined in the 3GPP standard. The information may be included in the individual band IE and the two CC IE. As will be described below, the PCell may use the individual band IE and the two CC IE as a basis to extrapolate the different CA combinations supported by the UE 105.

The UE 105 may additionally generate representative CA combinations with a maximum number of layers. As noted above, the information may be included in the representative CA combination IE and the layer IE. The representative CA combination may be for a given combination of bands that may be used as CCs in the highest order CC CA combination. Those skilled in the art will understand that there may be a plurality of different individual bands that may be used. Those skilled in the art will also understand that there may be a plurality of different combinations of these bands that may be combined as CCs in the CA functionality. In determining the representative CA combination for a given combination of bands and based on the other information that is determined, the CA combinations that may be included in the highest order CC CA combination for the given combination of bands may be determined using the coordinated reporting mechanism according to the exemplary embodiments.

In generating the representative CA combinations, the UE 105 may utilize a set of rules. In an exemplary first rule, the UE 105 may list a highest order CC CA combination for a given set of bands using 1 of the supported highest order CC CA combinations while not reporting a remainder of redundant permutations for the highest order CC CA combination. For example, the highest order CC CA combination may be for four CCs including a first band, a second band, a third band, and a fourth band. A permutation of the CA combination may be that the first band is the PCC while the second, third, and fourth bands are SCCs. Under the first rule, the redundant permutations may be when the second, third, or fourth band is the PCC with the remaining bands being SCCs.

In a second exemplary rule, the UE 105 may omit permutations of lower order CC CA combinations for the highest order CC CA combination having the given set of bands when the lower order CC CA combination is implicitly supported through the highest order CC CA combination. For example, when the highest order CC CA combination having the above noted four CCs is to be reported, redundant lower order CC CA combinations that mention three CC CA combinations involving three of the four bands may be omitted. It is noted that the second rule applies to when the lower order CC CA combination is three or more CCs. When the lower order CC CA combination reaches two CCs, as described above, the capability reporting engine 235 may report two CC CA combinations in the two CC IE.

In a third exemplary rule, the UE 105 may select a highest order sub-band for a given band within the set of bands to be used in the representative CA combination. When a given band is supported by a plurality of sub-bands, one or more lower order sub-bands may be understood to be implicitly included in a higher order sub-band that is used in a CA combination. Accordingly, lower order sub-bands included in a CA combination may be omitted. For example, when a band 66 is supported by sub-bands A, B, C, and D in which sub-band D is the highest order sub-band and sub-band A is the lowest order sub-band, the UE 105 may report that the band 66C is supported with an implicit understand that the band 66B and 66A are also supported, according to the third rule.

Using the above rules, the UE 105 may determine one or more representative CA combinations for a highest order CC CA combination that is to be reported to the PCell. Again, with the other information that is provided to the PCell, the representative CA combinations may enable the PCell to extrapolate a set of CA combinations that are supported by the UE 105 based on the representative CA combinations. As noted above, in an exemplary implementation, the highest order CC CA combination may be four CCs for the bands 2, 4, 5, and 30. The following is an example of how the representative CA combinations may be generated based on the above described rules.

Initially, the other information may be determined and provided to the PCell in corresponding IEs. For example, each individual one of the bands 2, 4, 5, and 30 may be reported to the PCell. Furthermore, each of the bands 2, 4, 5, and 30 may be reported as supporting multiple layers (e.g., 2 layers and 4 layers). In addition, the maximum supported layers may be indicated to the PCell. For illustrative purposes, the UE 105 may report that a maximum supported layer for a two CC CA combination is 6, a maximum supported layer for a three CC CA combination is 8, and a maximum supported layer for a four CC CA combination is 10.

To illustrate the manner in which the rules may be applied, each permutation of the CA combinations may be considered. As shown in Table 1, an exemplary two CC CA combination involving bands 2 and 4 is shown.

TABLE 1

| Two CC CA Combinations | | |
| --- | --- | --- |
| Combination | PCC | SCC |
| 1 | B2 (2 layer) | B4 (4 layer) |
| 2 | B2 (4 layer) | B4 (2 layer) |

TABLE 1-continued

| Two CC CA Combinations | | |
| --- | --- | --- |
| Combination | PCC | SCC |
| 3 | B4 (2 layer) | B2 (4 layer) |
| 4 | B4 (4 layer) | B2 (2 layer) |

As illustrated, the two CC CA combination involving bands 2 and 4 with a maximum layer of 6 (e.g., 4 layers+2 layers=6 layers) may result in 4 total permutations of CA combinations. In a substantially similar manner, an exemplary two CC CA combination involving bands 2 and 5 may similarly result in 4 total permutations of CA combinations. This may also be the case for the two CC CA combinations involving bands 2 and 30, bands 4 and 5, bands 4 and 30, and bands 5 and 30, each of these two CC CA combinations having 4 total permutations of CA combinations. Thus, for all two CC CA combinations where bands 2, 4, 5, and 30 may be selected and the maximum layer of 6 is used, there may be a total of 24 permutations of CA combinations. Under conventional approaches, all 24 permutations would be reported to the PCell.

In contrast to conventional approaches, by using the coordinated reporting mechanism according to the exemplary embodiments, the number of two CC CA combinations may be reported using representative CA combinations. Specifically, using the first rule, the redundant CA combinations may be omitted from reporting to reduce the amount of information that is provided to the PCell. As described above, the first rule may allow the omission of re-arrangements between PCC and SCC for the two CC CA combinations. Accordingly, the UE 105 may only include combinations 1 and 2 of Table 1. As will be described below with regard to the PCell, combinations 1 and 2 may be directly identified from the representative CA combinations while combinations 3 and 4 may be extrapolated from the representative CA combinations. Therefore, according to the exemplary embodiments, the number of CA combinations that may be reported for the two CC CA combinations involving bands 2, 4, 5, and 30 may be 12 representative CA combinations.

It is noted that the second and third rules may be inapplicable to the above example. For example, the second rule may apply to four CC CA combinations that may include three CC CA combinations, five CC CA combinations that may include four CC CA combinations and three CC CA combinations, etc. An example of how the second rule applies will be described below.

The third exemplary rule may apply when there are sub-bands for a given band. For example, the band 2 may include three sub-bands A, B, C where C is the highest order sub-band. An example of the different permutations involving bands 2 and 4 where band 2 has sub-bands A, B, and C is shown below in Table 2.

TABLE 2

| Two CC CA Combinations | | |
| --- | --- | --- |
| Combination | PCC | SCC |
| 1 | B2C (2 layer) | B4 (4 layer) |
| 2 | B2C (4 layer) | B4 (2 layer) |
| 3 | B4 (2 layer) | B2C (4 layer) |
| 4 | B4 (4 layer) | B2C (2 layer) |
| 5 | B2B (2 layer) | B4 (4 layer) |

TABLE 2-continued

Two CC CA Combinations

| Combination | PCC | SCC |
|---|---|---|
| 6 | B2B (4 layer) | B4 (2 layer) |
| 7 | B4 (2 layer) | B2B (4 layer) |
| 8 | B4 (4 layer) | B2B (2 layer) |
| 9 | B2A (2 layer) | B4 (4 layer) |
| 10 | B2A (4 layer) | B4 (2 layer) |
| 11 | B4 (2 layer) | B2A (4 layer) |
| 12 | B4 (4 layer) | B2A (2 layer) |

As illustrated, in a manner substantially similar to when band 2 has only one sub-band, each band/sub-band may result in four permutations of CA combinations. However, in also considering each sub-band, the permutations of two CC CA combinations involving bands 2 and 4 have 12 total CA combinations. Similarly, the permutations of two CC CA combinations involving bands 2 and 5 as well as bands 2 and 30 also have 12 total CA combinations. The other permutations of two CC CA combinations involving bands 4 and 5, bands 4 and 30, and bands 5 and 30 remain with 4 CA combinations.

In applying the third rule, combinations 5 to 12 of Table 2 may be omitted because the third rule allows for an understanding that lower order bands are implicitly included in higher order bands. That is, combinations 5 to 8 which involve band 2B and combinations 9 to 12 which involves band 2A may be omitted from reporting since combinations 1 to 4 involve band 2C, the highest order sub-band. Thus, any band with a lower sub-band (e.g., 2B) is covered by the band with a higher sub-band (e.g., 2C). In also applying the first rule, only combinations 1 and 2 may be reported as representative CA combinations. Thus, for two CC CA combinations including band 2 which has been reported as having sub-bands A, B, and C (e.g., using the individual band IE), the 12 permutations for this CA combination may be reduced to two representative CA combinations. When considering the other pairs of bands, a conventional approach may report a total of 48 permutations of CA combinations (e.g., 12 permutations for bands 2 and 4, 12 permutations for bands 2 and 5, 12 permutations for bands 2 and 30, 4 permutations for bands 4 and 5, 4 permutations for bands 4 and 30, and 4 permutations for bands 5 and 30). However, the coordinated reporting mechanism according to the exemplary embodiments may reduce the number of reported CA combinations using representative CA combinations to 12 CA combinations (e.g., 2 permutations for each of bands 2 and 4, bands 2 and 5, bands 2 and 30, bands 4 and 5, bands 4 and 30, and bands 5 and 30).

In describing the second rule, an example of a four CC CA combination involving bands 2, 4, 5, and 30 may be used in which each permutation of the CA combinations may be considered. As shown in Table 3, an exemplary four CC CA combination involving bands 2, 4, 5, and 30 is shown.

TABLE 3

Four CC CA Combinations

| Combination | PCC | SCC | SCC | SCC |
|---|---|---|---|---|
| 1 | B2 (4 layer) | B4 (2 layer) | B5 (2 layer) | B30 (2 layer) |
| 2 | B2 (2 layer) | B4 (4 layer) | B5 (2 layer) | B30 (2 layer) |
| 3 | B2 (2 layer) | B4 (2 layer) | B5 (4 layer) | B30 (2 layer) |
| 4 | B2 (2 layer) | B4 (2 layer) | B5 (2 layer) | B30 (4 layer) |
| 5 | B4 (4 layer) | B2 (2 layer) | B5 (2 layer) | B30 (2 layer) |
| 6 | B4 (2 layer) | B2 (4 layer) | B5 (2 layer) | B30 (2 layer) |

TABLE 3-continued

Four CC CA Combinations

| Combination | PCC | SCC | SCC | SCC |
|---|---|---|---|---|
| 7 | B4 (2 layer) | B2 (2 layer) | B5 (4 layer) | B30 (2 layer) |
| 8 | B4 (2 layer) | B2 (2 layer) | B5 (2 layer) | B30 (4 layer) |
| 9 | B5 (4 layer) | B2 (2 layer) | B4 (2 layer) | B30 (2 layer) |
| 10 | B5 (2 layer) | B2 (4 layer) | B4 (2 layer) | B30 (2 layer) |
| 11 | B5 (2 layer) | B2 (2 layer) | B4 (4 layer) | B30 (2 layer) |
| 12 | B5 (2 layer) | B2 (2 layer) | B4 (2 layer) | B30 (4 layer) |
| 13 | B30 (4 layer) | B2 (2 layer) | B4 (2 layer) | B5 (2 layer) |
| 14 | B30 (2 layer) | B2 (4 layer) | B4 (2 layer) | B5 (2 layer) |
| 15 | B30 (2 layer) | B2 (2 layer) | B4 (4 layer) | B5 (2 layer) |
| 16 | B30 (2 layer) | B2 (2 layer) | B4 (2 layer) | B5 (4 layer) |

As illustrated, the four CC CA combination involving bands 2, 4, 5, and 30 with a maximum layer of 10 (e.g., 4 layers+2 layers+2 layers+2 layers=10 layers) may result in 16 total permutations of CA combinations. Under conventional approaches, all 16 permutations would be reported to the PCell.

In contrast to conventional approaches, by using the coordinated reporting mechanism according to the exemplary embodiments, the number of four CC CA combinations may be reported using representative CA combinations. For example, using the first rule, the redundant CA combinations may be omitted from reporting to reduce the amount of information that is provided to the PCell. Again, the first rule may allow the omission of re-arrangements between PCC and SCC for the four CC CA combinations. Accordingly, the UE 105 may only include combinations 1 to 4 of Table 3. As will be described below with regard to the PCell, combinations 1 to 4 may be directly identified from the representative CA combinations while combinations 5 to 16 may be extrapolated from the representative CA combinations. Therefore, according to the exemplary embodiments, the number of CA combinations that may be reported for the four CC CA combinations involving bands 2, 4, 5, and 30 may be 4 representative CA combinations.

Since the four CC CA combinations implicitly includes three CC CA combinations involving three of the four bands, the second rule may also be applied in the above example. As described above, lower order CC CA combinations may be omitted from being reported. As will be described below, the PCell may be configured to extrapolate the permutations for lower order CC CA combinations involving the bands of the highest order CC CA combination by using the representative CA combinations. Under conventional approaches, the three CC CA combinations are reported to the PCell. The permutations of the three CC CA combinations having a maximum layer of 8 is illustrated in Table 4.

TABLE 4

Three CC CA Combinations

| Combination | PCC | SCC | SCC |
|---|---|---|---|
| 1 | B2 (4 layer) | B4 (2 layer) | B5 (2 layer) |
| 2 | B2 (2 layer) | B4 (4 layer) | B5 (2 layer) |
| 3 | B2 (2 layer) | B4 (2 layer) | B5 (4 layer) |
| 4 | B2 (4 layer) | B4 (2 layer) | B30 (2 layer) |
| 5 | B2 (2 layer) | B4 (4 layer) | B30 (2 layer) |
| 6 | B2 (2 layer) | B4 (2 layer) | B30 (4 layer) |
| 7 | B2 (4 layer) | B5 (2 layer) | B30 (2 layer) |
| 8 | B2 (2 layer) | B5 (4 layer) | B30 (2 layer) |
| 9 | B2 (2 layer) | B5 (2 layer) | B30 (4 layer) |
| 10 | B4 (4 layer) | B2 (2 layer) | B5 (2 layer) |
| 11 | B4 (2 layer) | B2 (4 layer) | B5 (2 layer) |

TABLE 4-continued

Three CC CA Combinations

| Combination | PCC | SCC | SCC |
|---|---|---|---|
| 12 | B4 (2 layer) | B2 (2 layer) | B5 (4 layer) |
| 13 | B4 (4 layer) | B2 (2 layer) | B30 (2 layer) |
| 14 | B4 (2 layer) | B2 (4 layer) | B30 (2 layer) |
| 15 | B4 (2 layer) | B2 (2 layer) | B30 (4 layer) |
| 16 | B4 (4 layer) | B5 (2 layer) | B30 (2 layer) |
| 17 | B4 (2 layer) | B5 (4 layer) | B30 (2 layer) |
| 18 | B4 (2 layer) | B5 (2 layer) | B30 (4 layer) |
| 19 | B5 (4 layer) | B2 (2 layer) | B4 (2 layer) |
| 20 | B5 (2 layer) | B2 (4 layer) | B4 (2 layer) |
| 21 | B5 (2 layer) | B2 (2 layer) | B4 (4 layer) |
| 22 | B5 (4 layer) | B2 (2 layer) | B30 (2 layer) |
| 23 | B5 (2 layer) | B2 (4 layer) | B30 (2 layer) |
| 24 | B5 (2 layer) | B2 (2 layer) | B30 (4 layer) |
| 25 | B5 (4 layer) | B4 (2 layer) | B30 (2 layer) |
| 26 | B5 (2 layer) | B4 (4 layer) | B30 (2 layer) |
| 27 | B5 (2 layer) | B4 (2 layer) | B30 (4 layer) |
| 28 | B30 (4 layer) | B2 (2 layer) | B4 (2 layer) |
| 29 | B30 (2 layer) | B2 (4 layer) | B4 (2 layer) |
| 30 | B30 (2 layer) | B2 (2 layer) | B4 (4 layer) |
| 31 | B30 (4 layer) | B2 (2 layer) | B5 (2 layer) |
| 32 | B30 (2 layer) | B2 (4 layer) | B5 (2 layer) |
| 33 | B30 (2 layer) | B2 (2 layer) | B5 (4 layer) |
| 34 | B30 (4 layer) | B4 (2 layer) | B5 (2 layer) |
| 35 | B30 (2 layer) | B4 (4 layer) | B5 (2 layer) |
| 36 | B30 (2 layer) | B4 (2 layer) | B5 (4 layer) |

As shown, there are 36 permutations involving bands 2, 4, 5, and 30 in three CC CA combinations. However, under the second rule, the lower order CC CA combinations may be omitted in reporting. As all 36 permutations are for a lower order CC CA combination, the UE 105 may omit these CA combinations from reporting to the PCell.

The above example of the four CC CA combination involving bands 2, 4, 5, and 30 may also incorporate the third rule if one or more of the bands includes sub-bands. In an extension to table 3 from applying the sub-band attribute of Table 3, the UE 105 may reduce the information being reported to the four representative CA combinations where any band with sub-bands is indicated with the highest sub-band in the representative CA combination.

It is noted that the above description may relate to operations as defined by the 3GPP standard prior to Release 13. However, the exemplary embodiments may also incorporate the features associated with reporting CA combinations by the UE 105 to the PCell as defined by Release 13 of the 3GPP standard. For example, as allowed when Release 13 is implemented, a skip fallback combination that is not supported may be omitted from reporting. By also incorporating the reporting features of Release 13, the UE 105 may further reduce the information that is reported to the PCell.

As is demonstrated in the examples above, the first aspect of the coordinated reporting mechanism may enable the UE 105 to report information for individual bands, information for characteristics of the individual bands, information for characteristics of a CA combination, and representative CA combinations for two CC CA combinations and a highest order CC CA combination. The amount of information reported to the PCell using the coordinated reporting mechanism is substantially reduced relative to conventional approaches of reporting CA combinations. However, those skilled in the art will also appreciate that the reported information may also result in a more comprehensive and/or exhaustive reporting of the supported CA combinations. Thus, from the perspective of the UE 105, less data is transmitted but more knowledge is given to the PCell.

A second aspect of the coordinated reporting mechanism may be performed by the PCell (e.g., the eNB 130 to which the UE 105 is associated for a connection to the LTE network). As described above, the CA combinations that are reported to the PCell are representative CA combinations. The PCell which is also configured to utilize the coordinated reporting mechanism may recognize that the representative CA combinations are only a subset of the CA combinations that are supported by the UE 105. Using the other information provided by the UE 105, the PCell may extrapolate the permutations of CA combinations that are supported by the UE 105 based on the representative CA combinations. As those skilled in the art will understand, the coordinated reporting mechanism may maintain certain limits that the 3GPP standard may impart (e.g., a maximum of 128 CA or 384 CA combinations that are allowed to be reported) but still enable the PCell to identify all the CA combinations that are available to the UE 105 (e.g., identify more CA combinations than the limit would allow if a conventional reporting approach was used).

Figure 3:
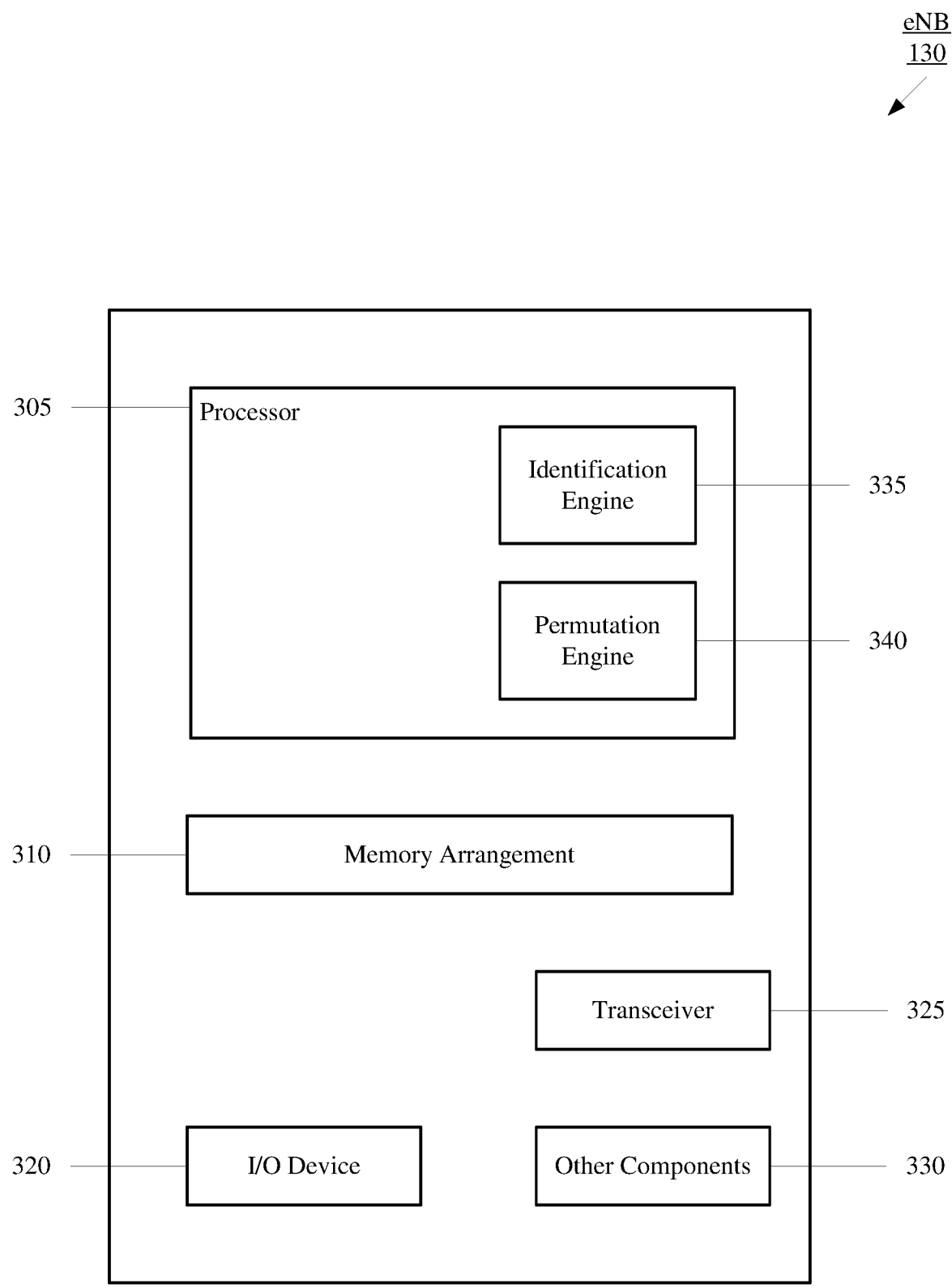
FIG. 3 shows an exemplary primary serving cell of the system of FIG. 1 according to various exemplary embodiments described herein.

FIG. 3 shows the exemplary PCell of the system 100 of FIG. 1 according to various exemplary embodiments described herein. For example, the PCell may be the eNB 130. However, the description for the eNB 130 herein may also apply to any eNB (e.g., eNBs 135, 140) that is configured with the second aspect of the coordinated reporting mechanism according to the exemplary embodiments. The eNB 130 may be configured to execute a plurality of engines that perform functionalities associated with the second aspect of the coordinated reporting mechanism according to the exemplary embodiments. The eNB 130 may represent any access node of the LTE network through which the UE 105 may establish a connection and manage network operations. The eNB 130 may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the eNB 130 to other electronic devices, etc.

The processor 305 may be configured to execute a plurality of engines of the eNB 130. For example, the engines may include an identification engine 335 and a permutation engine 340. As will be described in further detail below, the identification engine 335 may be configured to determine various types of information of the UE 105 regarding capabilities related to the CA functionality. The permutation engine 340 may be configured to extrapolate permutations of CA combinations based on representative CA combinations and other available information. The processor 305 may execute further engines of the eNB 130. For example, the processor 305 may execute a CA functionality engine that manages the CA functionality for the UE 105.

Similar to the engines of the UE 105, the above noted engines of the eNB 130 each being an application (e.g., a program) executed by the processor 305 is only exemplary. The functionality associated with the engines may also be represented as a separate incorporated component of the eNB 130 or may be a modular component coupled to the eNB 130, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, the functionality described for the processor 305 may be split among two or more processors such as a baseband processor and an applications processor. The exemplary embodiments may be implemented in any of these or other configurations of an eNB.

The memory 310 may be a hardware component configured to store data related to operations performed by the UE 110. The I/O device 320 may be a hardware component or ports that enable a user to interact with the eNB 130. The transceiver 325 may be a hardware component configured to exchange data with the UE 105 and any other UE in the system 100. The transceiver 325 may operate on a variety of different frequencies or channels (e.g., set of consecutive frequencies). Therefore, the transceiver 325 may include one or more components (e.g., radios) to enable the data exchange with various networks and UEs (e.g., when using bands lying outside a LTE range via LAA).

As described above, the eNB 130 may serve as the PCell for the UE 105. Thus, any management of channels/bandwidths used in the CA functionality (e.g., when licensed channels, unlicensed channels, or a combination of licensed and unlicensed channels are used) may be performed by the eNB 130. According to the exemplary embodiments, the PCell may receive the various IEs (e.g., the individual band IE, the two CC IE, the layer IE, and the representative CA combination IE) from the UE 105 and utilize the above described engines 335, 340 to determine the CA combinations that are supported by the UE 105.

As described above, the UE 105 may indicate that the UE 105 is CA capable and may transmit information regarding capabilities. The UE 105 may also indicate that the UE 105 is configured to utilize the coordinated reporting mechanism according to the exemplary embodiments. Thus, the PCell may determine the manner in which information received from the UE 105 is to be interpreted and used. Accordingly, the engines 335, 340 may be utilized. When the UE 105 is not configured with the coordinated reporting mechanism according to the exemplary embodiments, the PCell may use a fallback process of utilizing conventional reporting approaches. The eNB 130 may therefore be configured with conventional reporting engines to perform corresponding operations.

The identification engine 335 may determine various types of information of the UE 105 regarding capabilities related to the CA functionality. The identification engine 335 may receive the indications and the IEs from the UE 105. Once the identification engine 335 has identified that the UE 105 is CA capable and configured with the coordinated reporting mechanism according to the exemplary embodiments, the identification engine 335 may interpret the IEs so that subsequent processing may be performed. As noted above, the identification engine 335 may receive the individual band IE, the two CC IE, the layer IE, and the representative CA combination IE.

The identification engine 335 may receive the individual band IE to determine the individual bands supported by the UE 105 in using the CA functionality. As described above, the UE 105 may generate the individual band IE by including each band that is supported by the UE 105. For example, in continuing the example above, the UE 105 may include bands 2, 4, 5, and 30 in the individual band IE. It is noted that there may be a plurality of further bands that may also be included in the individual band IE. Thus, the identification engine 335 may extract the individual bands that the UE 105 is configured to support.

The identification engine 335 may also determine the characteristics of the individual bands. As described above, the UE 105 may generate the individual band IE by also including characteristics associated with the corresponding band. For example, a characteristic that may be associated with a selected band may be the layers that are supported by the band. Accordingly, the identification engine 335 may determine the MIMO support for each band. As noted above, the bands 2, 4, 5, and 30 may each be configured to support 2 layers or 4 layers. The identification engine 335 may extract this information from the individual band IE.

The identification engine 335 may receive the two CC IE to determine representative CA combinations for two CC CA combinations. As noted above, using the first rule, the UE 105 may have reduced the two CC CA combinations into the representative CA combinations (e.g., the four permutations for a given pair of bands as listed in Table 1 is reduced to two representative CA combinations). Furthermore, using the third rule, the UE 105 may further reduce the two CC CA combinations when one of the bands in the pair has a plurality of sub-bands (e.g., the twelve permutations for a given pair of bands where one band has three sub-bands as listed in Table 2 is reduced to four representative CA combinations). The remaining representative CA combinations may also have the first rule applied to further reduce the representative CA combinations (e.g., the four representative CA combinations of Table 2 resulting from using the third rule is further reduced using the first rule to two representative CA combinations).

The identification engine 335 may utilize the representative CA combinations included in the two CC IE and determine a subset of the permutations of the two CC CA combinations. The permutation engine 340 may then be used to extrapolate remaining permutations of CA combinations based on the representative CA combinations and other available information. For example, the representative CA combinations resulting from Table 1 (e.g., combinations 1 and 2) may be used to extrapolate the permutations listed in Table 1 (e.g., combinations 3 and 4) using a reverse process of the first rule. In another example, the representative CA combinations resulting from Table 2 (e.g., combinations 1 and 2) may be used to extrapolate a subset of permutations listed in Table 2 (e.g., combinations 3-12) using a reverse process of the first rule and a remaining subset of permutations listed in Table 2 using a reverse process of the third rule. In this manner, the identification engine 335 and the permutation engine 340 may determine the two CC CA combinations that are supported by the UE 105.

The identification engine 335 may receive the layer IE to determine a maximum MIMO support for a given CA combination having a defined order (e.g., four CCs). As noted above, for a four CC CA combination involving bands 2, 4, 5, and 30, the maximum MIMO support that is indicated for this CA combination may be indicated as 10 or a capability of supporting 10 layers. Thus, for the four CC CA combination where each of the bands 2, 4, 5, and 30 are configured to support 2 layers or 4 layers, only one of the bands may exhibit 4 layers while the remaining bands exhibit 2 layers so that 10 total layers is the resulting sum. The identification engine 335 may identify the maximum MIMO support information and the associated CA combination which may be provided to the permutation engine 340. The permutation engine 340 may then determine the manner in which the CCs are to be used based on the maximum MIMO support value to determine the permutations of the highest order CC CA combination (as will be described below).

The implementation described above where the four CC CA combination is configured to support a maximum MIMO of 10 layers and each of the bands 2, 4, 5, and 30 being configured to support 2 layers or 4 layers is only exemplary. Those skilled in the art will understand that the maximum MIMO may be any configurable number and each of the bands may support any number of layers. For example, in another exemplary implementation, the UE 105 may be configured to support bands 2, 4, 5, and 30 where each of the bands 2, 4, 5, and 30 are configured to only support 2 layers. The maximum MIMO support may be reported as 8 layers (e.g., the only allowable configuration). It is noted that this implementation may result in the permutation engine 340 determining four permutations where each permutation involves one of the bands serving as a PCC and the remaining bands serving as SCCs. However, using the first rule, the UE 105 may only include one representative CA combination for the permutation engine 340 to extrapolate the remaining three permutations.

In a further exemplary implementation, the UE 105 may be configured to support bands 2, 4, 5, and 30 where bands 2 and 30 are configured to support 2 layers or 4 layers while bands 4 and 5 are configured to support 2 layers. Accordingly, there may be a plurality of different maximum MIMO support values that are reported in the layer IE. In a first example, the maximum MIMO support may be reported as 8 layers. Thus, this implementation may have a substantially similar result as the previous example (e.g., where the only allowed MIMO support is 8 layers). In a second example, the maximum MIMO support may be reported as 10 layers. The permutations of CA combinations under these conditions are listed in Table 5 below. It is noted that applying the first rule may reduce the CA combinations to two representative CA combinations (e.g., combinations 1 and 2). The permutation engine 340 may then reverse the first rule for the two representative CA combinations to determine all the permutations listed in Table 5.

TABLE 5

Four CC CA Combinations

| Combination | PCC | SCC | SCC | SCC |
|---|---|---|---|---|
| 1 | B2 (4 layer) | B4 (2 layer) | B5 (2 layer) | B30 (2 layer) |
| 2 | B2 (2 layer) | B4 (2 layer) | B5 (2 layer) | B30 (4 layer) |
| 3 | B4 (2 layer) | B2 (4 layer) | B5 (2 layer) | B30 (2 layer) |
| 4 | B4 (2 layer) | B2 (2 layer) | B5 (2 layer) | B30 (4 layer) |
| 5 | B5 (2 layer) | B2 (4 layer) | B4 (2 layer) | B30 (2 layer) |
| 6 | B5 (2 layer) | B2 (2 layer) | B4 (2 layer) | B30 (4 layer) |
| 7 | B30 (2 layer) | B2 (4 layer) | B4 (2 layer) | B5 (2 layer) |
| 8 | B30 (4 layer) | B2 (2 layer) | B4 (2 layer) | B5 (2 layer) |

In a third example, the maximum MIMO support may be reported as 12 layers. The permutations of CA combinations under these conditions are listed in Table 6 below. It is noted that applying the first rule may reduce the CA combinations to one representative CA combination (e.g., combination 1). The permutation engine 340 may then reverse the first rule for the one representative CA combination to determine all the permutations listed in Table 6.

TABLE 6

Four CC CA Combinations

| Combination | PCC | SCC | SCC | SCC |
|---|---|---|---|---|
| 1 | B2 (4 layer) | B4 (2 layer) | B5 (2 layer) | B30 (4 layer) |
| 2 | B4 (2 layer) | B2 (4 layer) | B5 (2 layer) | B30 (4 layer) |
| 3 | B5 (2 layer) | B2 (4 layer) | B4 (2 layer) | B30 (4 layer) |
| 4 | B30 (4 layer) | B2 (4 layer) | B4 (2 layer) | B5 (2 layer) |

The identification engine 335 may receive the representative CA combination IE to determine the representative CA combinations for a highest order CC CA combination involving a set of bands (e.g., bands 2, 4, 5, and 30) that the UE 105 is reporting to the PCell. As described above, the representative CA combination(s) may be a subset of permutation(s) of a highest order CC CA combination for the set of bands that are supported by the UE 105. Thus, the identification engine 335 may identify the select permutation(s) of the highest order CC CA combination which directly corresponds to the representative CA combination(s). The permutation engine 340 may then reverse the first rule and/or the third rule to determine the remaining permutations of the highest order CC CA combination.

The above process illustrates how the PCell is configured to utilize the coordinated reporting mechanism according to the exemplary embodiments to determine the permutations of a highest order CC CA combination for a given set of bands and determine the permutations of two CC CA combinations for the given set of bands. However, as described above, the coordinated reporting mechanism according to the exemplary embodiments may also utilize a second rule that allows the UE 105 to omit reporting lower order CC CA combinations where the lower order is less than the highest order but greater than two CCs. For example, when the highest order is five CCs, the second rule allows for four CC CA combinations and three CC CA combinations to be omitted from reporting. The permutation engine 340 may be configured to further determine the permutations for the lower order CC CA combinations.

As described above, the highest order CC CA combination may include one or more lower order CC CA combinations. For example, the four CC CA combination involving bands 2, 4, 5, and 30 where each of the bands may support 2 layers or 4 layers and where a maximum MIMO support for the four CC CA combination is reported as 10 (e.g., permutations of which are listed in Table 3) while a maximum MIMO support for the three CC CA combination is reported as 8, the permutations for the three CC CA combinations may be listed in Table 4. The permutation engine 340 may utilize the information of the individual band IE, the layer IE, and the representative CA combination IE to determine the permutations of the lower order CA CC combination(s) (e.g., the three CC CA combinations shown in the Table 4).

It is again noted that the above description may relate to operations as defined by the 3GPP standard prior to Release 13. When the exemplary embodiments also incorporate the features associated with reporting CA combinations by the UE 105 to the PCell as defined by Release 13 of the 3GPP standard, the PCell may integrate corresponding operations to adjust how permutations of supported CA combinations are determined in light of these features. For example, under Release 13, a skip fallback combination that is not supported is omitted from reporting. Thus, the PCell may not include such a permutation in the list of supported CA combinations of any order for the UE 105.

As is demonstrated in the examples above, the second aspect of the coordinated reporting mechanism may enable the PCell to determine the supported CA combinations of the UE 105 based on information reported for individual bands, information reported for characteristics of the individual bands, information reported for characteristics of a CA combination, and representative CA combinations for two CC CA combinations and a highest order CC CA combination. The manner in which information is processed by the PCell using the coordinated reporting mechanism allows for less data to be received from the UE 105. However, through the processing in reversing the rules of the coordinated reporting mechanism, the PCell is configured to determine a more comprehensive and/or exhaustive list of supported CA combinations.

Figure 4:
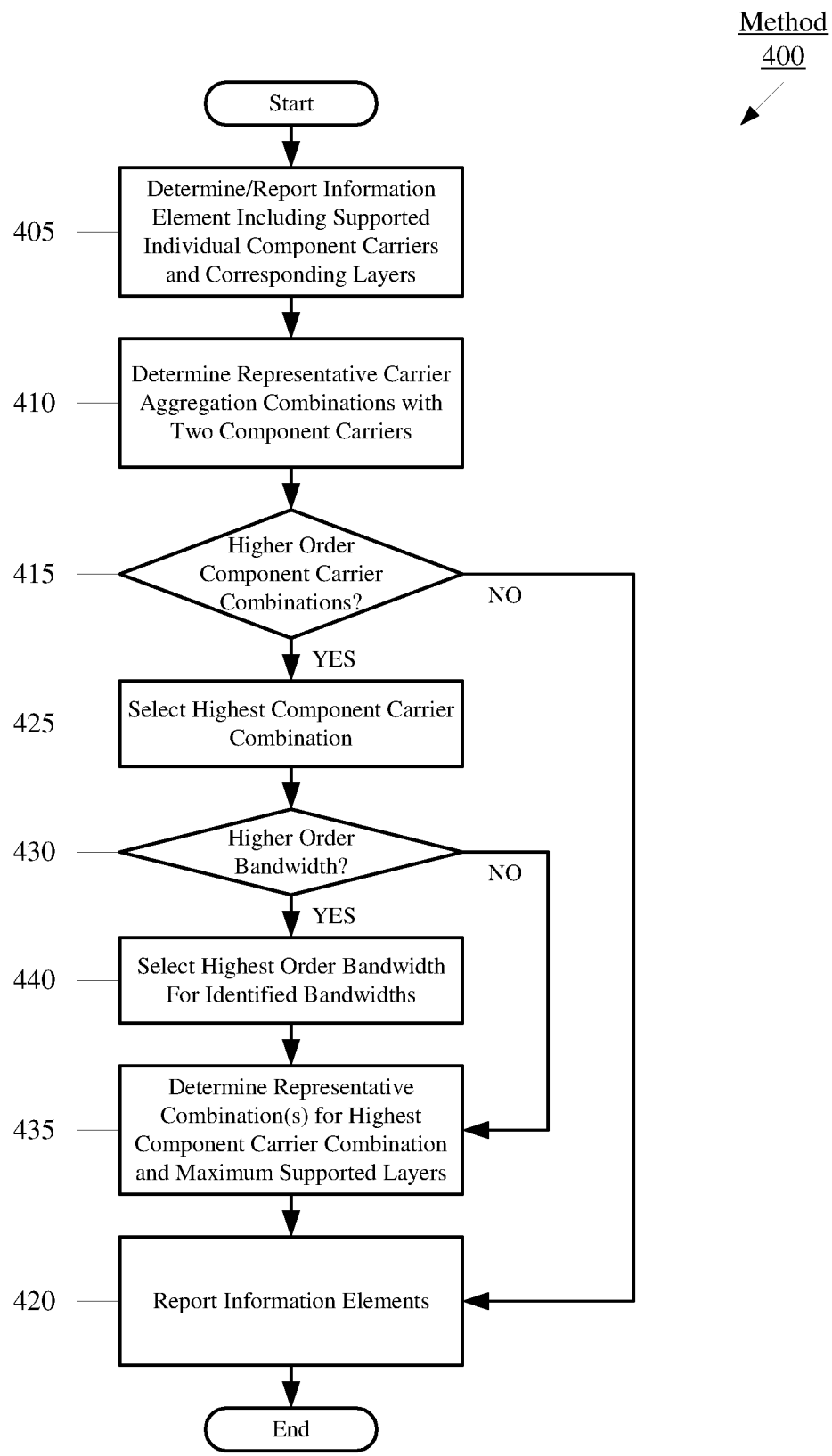
FIG. 4 shows an exemplary method for reporting representative carrier aggregation combinations according to various exemplary embodiments described herein.

FIG. 4 shows an exemplary method 400 for reporting representative CA combinations according to various exemplary embodiments described herein. The method 400 may relate to how the UE 105 identifies the supported CA combinations and determines the representative CA combinations to represent the supported CA combinations. Thus, the method 400 will be described from the perspective of the UE 105 as illustrated in FIG. 2.

In 405, the UE 105 determines the individual bands that are supported by the UE 105. When the UE 105 is connected to a LTE network, the individual bands may be LTE bands or licensed bands of the LTE network. When the UE 105 is connected to a different type of network, the individual bands may be licensed bands associated with the connected network. The UE 105 and the connected network may also be configured to utilize unlicensed bands (e.g., via LAA). Therefore, the individual bands may also include unlicensed bands. The UE 105 may also determine characteristics of the individual bands. For example, the UE 105 may determine the layers that are supported by the bands with regard to MIMO support. In a particular example, the individual bands may include licensed bands 2, 4, 5, and 30 and the MIMO support for each band may be determined as 2 layers or 4 layers. In another example, a band may have a plurality of sub-bands from a highest order sub-band to a lowest order sub-band. The UE 105 may generate an individual band IE for the information related to the individual bands and the corresponding characteristics. Subsequently, the UE 105 may transmit the individual band IE to the PCell.

In 410, the UE 105 determines two CC CA combinations for a CA combination that is to be reported to the PCell. For example, the UE 105 may be reporting a four CC CA combination involving a set of four bands which are a subset of the individual supported bands. The UE 105 may determine the various permutations of the two CC CA combinations where pairs of the four bands are involved. Based on the permutations, the UE 105 may determine representative CA combinations for the two CC CA combinations using the first rule and the third rule (when applicable). It is noted that the intermediate step of determining the permutations of the two CC CA combinations is only exemplary. The UE 105 may be configured to utilize the individual bands with their corresponding characteristics (e.g., MIMO support) and directly determine the representative CA combinations for the two CC CA combinations. The UE 105 may generate a two CC IE for the representative CA combinations of the two CC CA combinations.

In 415, the UE 105 determines whether there is any higher order CC CA combination for the CA combination that is to be reported to the PCell. When the UE 105 is only reporting the two CC CA combinations and there is no higher order CC CA combination, the UE 105 continues to 420. In 420, the UE 105 reports any generated IE to the PCell. In this exemplary scenario, the UE 105 transmits the two CC IE to the PCell. When there is at least one higher order CC CA combination, the UE 105 continues from 415 to 425.

In 425, the UE 105 selects the highest order CC CA combination for the CA combination that is to be reported to the PCell. The highest order CC CA combination may involve a set of bands from which the two CC CA combinations was determined. In 430, the UE 105 determines whether any of the bands included in the highest order CC CA combination has a plurality of sub-bands. As noted above, a characteristic of the individual bands may involve one or more sub-bands. When each of the bands of the highest order CC CA combination include only one sub-band, the UE 105 continues to 435. In 435, the UE 105 may determine the various permutations of the highest order CC CA combinations where the set of bands is involved. Based on the permutations, the UE 105 may determine representative CA combinations for the highest order CC CA combination using the first rule. With only one sub-band for each of the bands, the third rule may be inapplicable. It is noted that the intermediate step of determining the permutations of the highest order CC CA combination is only exemplary. The UE 105 may be configured to utilize the individual bands with their corresponding characteristics (e.g., MIMO support) and directly determine the representative CA combinations for the highest order CC CA combinations. The UE 105 may generate a representative CA combination IE for the representative CA combinations of the highest order CC CA combinations.

In 435, the UE 105 may also determine a maximum MIMO support for the highest order CC CA combination based on the given CA combination and the capability of the individual bands that have defined layers that are supported by the UE 105. The UE 105 may also generate a layer IE for the highest order CC CA combination with an identification of the highest order CC CA combination having a set of bands. The UE 105 may continue to 420 where the two CC IE, the representative CA combination IE, and the layer IE are reported to the PCell.

Returning to 430, when at least one of the bands of the highest order CC CA combination has a plurality of sub-bands, the UE 105 continues to 440. In 440, the UE 105 selects a highest order bandwidth for each of the bands that has a plurality of sub-bands. The UE 105 then continues to 435 where the UE 105 determines representative CA combinations for the highest order CC CA combination using the first rule and the highest order bandwidth using the third rule. The UE 105 may generate a representative CA combination IE for the representative CA combinations of the highest order CC CA combinations. The UE 105 may also determine a maximum MIMO support for the highest order CC CA combination using the highest order bandwidth. Thus, the UE 105 may also generate a layer IE for the highest order CC CA combination. The UE 105 may continue to 420 where the two CC IE, the representative CA combination IE, and the layer IE are reported to the PCell.

It is noted that the second rule is impliedly incorporated into the method 400. For example, when the highest order CC CA combination is four or more, the second rule is impliedly incorporated. Since the second rule allows for lower order CC CA combinations to be omitted from reporting, the UE 105 may perform the method 400 without performing any directly corresponding operations in this omission. As one skilled in the art will understand, when the highest order CC CA combination is three, the second rule may be inapplicable as there is no lower order CC CA combination that is less than the highest order but more than two CCs.

Figure 5:
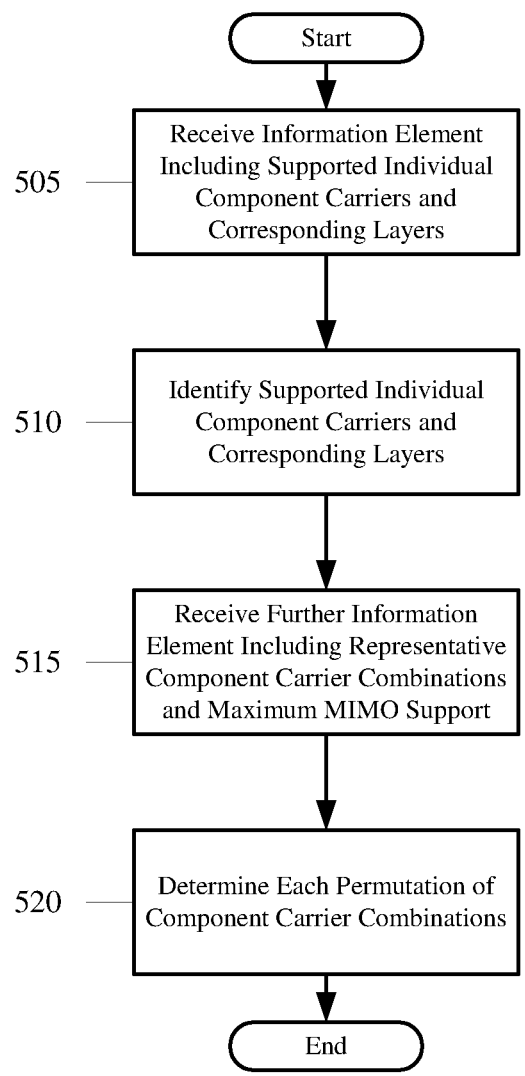
FIG. 5 shows an exemplary method for identifying supported carrier aggregation combinations according to various exemplary embodiments described herein.

FIG. 5 shows an exemplary method 500 for identifying supported CA combinations according to various exemplary embodiments described herein. The method 500 may relate to how the PCell (e.g., the eNB 130) extrapolates the supported CA combinations of the UE 105 based on received information and reporting from the UE 105. Thus, the method 500 will be described from the perspective of the PCell as illustrated in FIG. 3.

In 505, the PCell receives an individual band IE from the UE 105. As described above, the individual band IE may include information of individual supported bands that the UE 105 is configured to use in the CA functionality. Thus, in 510, the PCell may identify the set of individual bands that may be used in the CA functionality for the UE 105. The individual band IE may also indicate characteristics for each of the bands. In a first example, the characteristics may include the MIMO support that the UE 105 is configured to use for the band. Specifically, the MIMO support may be the layers that the band may be used for the UE 105. In a second example, the characteristics may include the sub-band information for each of the bands. Specifically, the sub-band information may indicate the sub-bands that each band may use with regard to the UE 105. The sub-band information may indicate only one sub-band or may indicate a plurality of sub-bands.

In 515, the UE 105 receives further IEs from the UE 105. As described above, the further IEs may include a two CC IE, a layer IE, and a representative CA combination IE. In 520, the UE 105 determines each permutation of CA combinations based on the received further IEs. Specifically, two CC CA combinations, highest order CC CA combinations, and any lower order CC CA combinations may be determined. As described above, the representative CA combinations for the two CC CA combinations and the highest order CC CA combinations may be select permutations of the respective order CC CA combinations. Using the first, second, and/or third rule, the representative CA combinations may be used to then determine the permutations for each order CC CA combination. In reversing the first rule, the representative CA combination may be used to determine omitted redundant combinations (e.g., reordering of CCs between PCC and SCC). In reversing the second rule, the representative CA combination may be used to determine omitted lower order CC CA combinations. In reversing the third rule, the representative CA combination may be used to determine omitted CA combinations involving lower order sub-bands for a given band.

It is noted that the two CC IE and the representative CA combination IE being described as two separate IEs is only exemplary. In another exemplary embodiment, the representative CA combination IE may include the representative CA combinations for the highest order CC CA combination and the representative CA combinations for the two CC CA combinations. As the representative CA combinations observe the same set of rules, the information may be conveyed to the PCell in an individual IE. The PCell may also distinguish the representative CA combinations for the highest order CC CA combination from the representative CA combinations for the two CC CA combinations as the representative CA combinations for the highest order CC CA combination may include two or more SCCs whereas the representative CA combinations for the two CC CA combinations may include only one SCC.

The exemplary embodiments provide a device, system, and method of a coordinated reporting mechanism between a UE and a PCell. The coordinated reporting mechanism may include a plurality of rules that define a manner for the UE to generate data to be advertised to the PCell regarding supported CA combinations and that are used for the PCell to determine the supported CA combinations of the UE. A first rule may allow the UE to omit redundant CA combinations that reorder the underlying CCs. Thus, knowing the first rule, the PCell may determine the omitted redundant CA combinations based on a representative CA combination. A second rule may allow the UE to omit lower order CA combinations where the lower order is less than a highest order but greater than two CCs. Thus, knowing the second rule, the PCell may determine whether there are any lower order CC CA combinations and determine the CA combinations for the lower order CC CA combinations. A third rule may allow the UE to omit lower order sub-bands for bands having a plurality of sub-bands from the CA combinations. Thus, knowing the third rule, the PCell may determine the omitted CA combinations including bands having lower order sub-bands.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment (UE) configured with a carrier aggregation (CA) functionality, the UE connected to a network via a base station that serves as a primary serving cell (PCell) providing a primary component carrier (PCC) to the UE:
   determining a plurality of bands that are supported by the UE for use in the CA functionality;
   generating an individual band information element (IE) including band information for the bands;
   determining at least one representative CA combination having an order, the order indicating a total number of component carriers (CCs), wherein each of the at least one representative CA combination is configured to be used as a basis for the base station to extrapolate a plurality of CA combinations supported by the UE having the order based on the band information;
   generating a representative CA combination IE including the at least one representative CA combination; and
   transmitting the individual band IE and the representative CA combination IE to the base station.

2. The method of claim 1, wherein the band information further indicates characteristics for the bands.

3. The method of claim 2, wherein the characteristics comprise a multiple input multiple output (MIMO) support for each band, a sub-band indication for each band, or a combination thereof, wherein the MIMO support identifies at least one layer of a corresponding band that is supported by the UE, wherein the sub-band indication identifies at least one sub-band of a corresponding band that is supported by the UE.

4. The method of claim 3, wherein one of bands of the representative CA combination has a plurality of sub-bands, the representative CA combination including the band with a highest order one of the sub-bands.

5. The method of claim 4, wherein select ones of the plurality of CA combinations includes the band with a lower order one of the sub-bands.

6. The method of claim 1, wherein each of the CCs in the order corresponds to a respective one of the bands.

7. The method of claim 1, wherein the order is greater than two.

8. The method of claim 7, further comprising:
generating a two CC IE including at least one two CC representative CA combination, the two CC representative CA combination corresponding to the order being two, the CCs of the two CC representative CA combination including a subset of bands included in the representative CA combination.

9. The method of claim 1, wherein the network is a Long Term Evolution (LTE) network and the base station is an evolved Node B (eNB).

10. A method, comprising:
at an evolved Node B (eNB) configured with a carrier aggregation (CA) functionality, the eNB serving as a primary serving cell (PCell) providing a primary component carrier (PCC) to a user equipment (UE):
receiving an individual band information element (IE) including band information for a plurality of bands that are supported by the UE for use in the CA functionality;
receiving a representative CA combination IE including at least one representative CA combination, the representative CA combination corresponding to an order, the order indicating a total number of component carriers (CCs); and
determining a plurality of CA combinations having the order based on the representative CA combination and the band information.

11. The method of claim 10, wherein the band information further indicates characteristics for the bands, wherein the characteristics comprise a multiple input multiple output (MIMO) support for each band, a sub-band indication for each band, or a combination thereof, wherein the MIMO support identifies at least one layer of a corresponding band that is supported by the UE, wherein the sub-band indication identifies at least one sub-band of a corresponding band that is supported by the UE.

12. The method of claim 10, wherein each of the CCs in the order corresponds to a respective one of the bands.

13. The method of claim 10, wherein the order is greater than two.

14. The method of claim 13, further comprising:
receiving a two CC IE including at least one two CC representative CA combination, the two CC representative CA combination corresponding to the order being two, the CCs of the two CC representative CA combination including a subset of bands included in the representative CA combination; and
determining a plurality of two CC CA combinations based on the two CC representative CA combination and the band information.

15. The method of claim 10, wherein the order is greater than three.

16. The method of claim 15, further comprising:
determining a lower order CC CA combination, a further order of the lower order CC CA combination being lower than the order of the representative CA combination, the CCs of the lower order CC CA combination including a subset of bands included in the representative CA combination; and
determining a plurality of lower order CA combinations having the lower order based on the representative CA combination and the band information.

17. A user equipment (UE), comprising:
a transceiver configured with a carrier aggregation (CA) functionality to connect to a network via a first base station that serves as a primary serving cell (PCell) providing a primary component carrier (PCC) and at least one second base station that serves as a secondary serving cell (SCell) providing a secondary component carrier (SCC); and
a processor configured to determine a plurality of bands that are supported by the UE for use in the CA functionality, generate an individual band information element (IE) including band information for the bands, determine at least one representative CA combination having an order, the order indicating a total number of component carriers (CCs), the at least one representative CA combination configured to be used as a basis for the base station to extrapolate a plurality of CA combinations supported by the UE having the order based on the band information and generate a representative CA combination IE including the at least one representative CA combination.

18. The UE of claim 17, wherein the transceiver is further configured to transmit the individual band IE and the representative CA combination IE to the first base station.

19. The UE of claim 17, wherein, when the order is greater than two, the processor is further configured to generate a two CC IE including at least one two CC representative CA combination, the two CC representative CA combination corresponding to the order being two, the CCs of the two CC representative CA combination including a subset of bands included in the representative CA combination.

20. The UE of claim 17, wherein the band information further indicates characteristics for the bands, wherein the characteristics comprise a multiple input multiple output (MIMO) support for each band, a sub-band indication for each band, or a combination thereof, wherein the MIMO support identifies at least one layer of a corresponding band that is supported by the UE, wherein the sub-band indication identifies at least one sub-band of a corresponding band that is supported by the UE.

* * * * *